United States Patent
Rose

[15] 3,660,018

[45] May 2, 1972

[54] METHOD OF MANUFACTURING CARBON FIBRE

[72] Inventor: Philip George Rose, Burton-on-Trent, England

[73] Assignee: Rolls Royce Limited, Derby, England

[22] Filed: July 31, 1970

[21] Appl. No.: 60,103

[30] Foreign Application Priority Data

Aug. 4, 1969 Great Britain......................38,868/69

[52] U.S. Cl..........................23/209.4, 23/209.1, 23/209.2
[51] Int. Cl. .......................................................C01b 31/07
[58] Field of Search ..................23/209.1, 209.2, 209.4, 209, 23/220; 264/29; 8/115.5

[56] References Cited

UNITED STATES PATENTS

| | | | |
|---|---|---|---|
| 3,552,923 | 1/1971 | Carpenter et al. | 23/209.1 |
| 3,508,874 | 4/1970 | Rulison | 23/209.1 |
| 3,412,062 | 11/1968 | Johnson et al. | 260/37 |
| 3,532,466 | 10/1970 | Johnson et al. | 23/209.4 |
| 3,285,696 | 11/1966 | Tsunoda | 23/209.1 |

*Primary Examiner*—Edward J. Meros
*Attorney*—Cushman, Darby & Cushman

[57] ABSTRACT

The invention relates to a method of manufacturing improved carbon fibre from polyacrylonitrile in which the polyacrylonitrile is heated to a temperature between 150° C. and 300° C. in an oxygen containing atmosphere to stabilize its structure, then pyrolysed at between 700° and 1,500° C. in an atmosphere containing between 5 and 500 parts per million of oxygen and being otherwise inert.

5 Claims, No Drawings

METHOD OF MANUFACTURING CARBON FIBRE

This invention relates to a method of manufacturing carbon fiber material.

In the development of the manufacture of carbon fiber a major target has been the improvement of the Youngs Modulus and/or the ultimate tensile strength of the end product. We have invented a method of manufacture of these fibers which enables these values to be improved.

Throughout this specification the term polyacrylonitrile is to be understood to include copolymers of polyacrylonitrile such as are normally understood to be included in the textile definition of polyacrylonitrile.

According to the present invention a method of manufacturing carbon fiber comprises the steps of firstly heating polyacrylonitrile fiber in an oxygen containing atmosphere to a temperature in the range 150° – 300° C to cause some stabilising modification of the molecular structure, and secondly heating the fiber to a temperature in the range 700° C to 2,000 C in an atmosphere containing between 5 and 500 parts per million of oxygen and being otherwise inert.

Preferably said second step comprises heating in an atmosphere containing between 50 and 250 parts per million of oxygen, and the temperature of said second step is preferably between 900° and 1,500° C.

Said first step may comprise heating the fiber in air at a temperature of 210° C for 2 hours, 220° C for 2 hours, and 250° C for 3 hours.

Said atmosphere in said second step is preferably moving, thus it may comprise a purge gas.

In examples of the invention, polyacrylonitrile fiber known as "Courtelle" (registered trade mark) and obtained from Courtaulds Limited was firstly heat treated in an atmosphere of air of 2 hours at a temperature of 210° C, 2 hours at a temperature of 220° C, and 2 hours at a temperature of 250° C. The fiber was then removed to a second furnace where it was heated to a temperature of 1,000° C for a time of some 7 hours. During the first mentioned heat treatment the molecular structure of the fiber is modified by linking to a more stable structure while in the second step the fiber material is pyrolysed to a residue which is substantially all carbon.

So that the invention could be demonstrated, the purge gas for the furnace in the second step was arranged to be varied in its oxygen content; it in fact comprises argon with added oxygen to a predetermined amount. Fiber was produced with varying amounts of oxygen in the purge gas, and the resulting fiber tested by standard methods for Young's Modulus and ultimate tensile strength.

The results were as follows:

| Purge Gas Oxygen Content | UTS $\times 10^3$ psi | Young's Modulus $\times 10^6$ psi |
| --- | --- | --- |
| 2.8 parts per million | 210 | 22 |
| 18 parts per million | 290 | 22 |
| 35 parts per million | 300 | 23.5 |
| 50 parts per million | 310 | 25 |
| 110 parts per million | 317 | 31 |
| 170 parts per million | 315 | 27 |
| 330 parts per million | 212 | 22 |
| 430 parts per million | 180 | 24 |
| 650 parts per million | 119 | 22.5 |
| 800 parts per million | 108 | 22.5 |
| 1500 parts per million | 115 | 22.5 |

It will be seen that between values of the oxygen content of 5 and 500 parts per million, the properties of the resulting fiber increase markedly, while in the preferred range of 50 and 250 parts per million of oxygen, the properties reach an optimum.

It will be appreciated that fibers of various materials falling within the textile definition of polyacrylonitrile could be used in the method of this invention, and that the heat treatment could vary within the limits set out in the opening paragraph.

I claim:

1. A method of manufacturing carbon fiber comprising the steps of firstly heating polyacrylonitrile fiber in an oxygen containing atmosphere to a temperature in the range 150° – 300° C to cause some stabilizing modification of the molecular structure, and secondly heating the fiber to a temperature in the range 700° – 1,500°C in a moving purge atmosphere containing between 50 and 250 parts per million of oxygen and being otherwise inert.

2. A method as claimed in claim 1 and in which the fibre is heated in said second step to a temperature in the range 900° – 1,500° C.

3. A method as claimed in claim 1 and in which said first step comprises heating the fibre in air.

4. A method as claimed in claim 3 and in which said first step comprises heating the fibre to a temperature of 210° C for 2 hours, 220° C for 2 hours and 250° C for 3 hours.

5. A method as claimed in claim 1 and in which the inert component of said purge gas comprises argon.

* * * * *